(12) United States Patent
Lilley et al.

(10) Patent No.: US 11,763,259 B1
(45) Date of Patent: Sep. 19, 2023

(54) SYSTEMS AND METHODS TO GENERATE UNITS OF WORK IN A COLLABORATION ENVIRONMENT

(71) Applicant: Asana, Inc., San Francisco, CA (US)

(72) Inventors: Gregory Lilley, San Francisco, CA (US); Abigail Lorean Kelly, San Francisco, CA (US); Kshitij Grover, San Jose, CA (US); Edwin Lai, San Francisco, CA (US); Rahul Jiresal, Oakland, CA (US); Sika Gasinu, Berkeley, CA (US); Nicholas Pucel, San Francisco, CA (US); Gavin Douglas, Oakland, CA (US); Allen David Chang, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 177 days.

(21) Appl. No.: 16/796,554

(22) Filed: Feb. 20, 2020

(51) Int. Cl.
*G06Q 10/10* (2023.01)
*G06F 16/176* (2019.01)
*G06Q 10/101* (2023.01)

(52) U.S. Cl.
CPC .......... *G06Q 10/103* (2013.01); *G06F 16/176* (2019.01); *G06Q 10/101* (2013.01)

(58) Field of Classification Search
None
See application file for complete search history.

(56) References Cited

U.S. PATENT DOCUMENTS

| | | | |
|---|---|---|---|
| 5,530,861 A | 6/1996 | Diamant et al. | |
| 5,608,898 A | 3/1997 | Turpin et al. | |
| 5,611,076 A | 3/1997 | Durflinger et al. | |
| 5,721,770 A | 2/1998 | Kohler | |
| 6,292,830 B1 | 9/2001 | Taylor et al. | |
| 6,332,147 B1 | 12/2001 | Moran et al. | |
| 6,385,639 B1 | 5/2002 | Togawa | |
| 6,629,081 B1 | 9/2003 | Cornelius et al. | |

(Continued)

FOREIGN PATENT DOCUMENTS

| | | | |
|---|---|---|---|
| CN | 101305350 A | 11/2008 | |
| CN | 101563671 A | 10/2009 | |

(Continued)

OTHER PUBLICATIONS

"Creating Tables with Fields from 2 Different Tables, published: 2009, publisher: StackOverflow, pages: 1-2. (Year: 2009).

(Continued)

*Primary Examiner* — Peter Ludwig
*Assistant Examiner* — Donald J Edmonds
(74) *Attorney, Agent, or Firm* — ESPLIN & ASSOCIATES, PC

(57) ABSTRACT

Systems and methods for generating units of work in a collaboration environment are disclosed. Exemplary implementations may: manage environment state information including work units records describing units of work assigned to individual users within the collaboration environment, individual sets of work unit records being defined by a record hierarchy, individual units of work including one or more digital content items; obtain user input information conveying user input on, or relating to, individual digital content items of the individual units of work; generate one or more work unit records based on the user input information, such that responsive to the user input information conveying first user input by a first user on, or relating to, a first digital content item, generate a second work unit record describing a second unit of work, the second work unit record being subordinate to a first work unit record; and/or perform other operations.

18 Claims, 5 Drawing Sheets

(56) References Cited

U.S. PATENT DOCUMENTS

| | | | |
|---|---|---|---|
| 6,769,013 B2 | 7/2004 | Frees et al. |
| 7,020,697 B1 | 3/2006 | Goodman et al. |
| 7,086,062 B1 | 8/2006 | Faour et al. |
| 7,640,511 B1 | 12/2009 | Keel et al. |
| 7,676,542 B2 | 3/2010 | Moser et al. |
| 7,779,039 B2 | 8/2010 | Weissman et al. |
| RE41,848 E | 10/2010 | Daniell et al. |
| 7,996,744 B2 | 8/2011 | Ojala et al. |
| 7,996,774 B1 | 8/2011 | Sidenur et al. |
| 8,522,240 B1* | 8/2013 | Merwarth et al. | G06Q 10/0631 705/7.41 |
| 8,527,287 B1 | 9/2013 | Bhatia |
| 8,768,751 B2 | 7/2014 | Jakowski et al. |
| 9,201,952 B1 | 12/2015 | Chau et al. |
| 9,208,262 B2 | 12/2015 | Bechtel et al. |
| 9,251,484 B2 | 2/2016 | Cantor et al. |
| 9,600,136 B1 | 3/2017 | Yang et al. |
| 9,674,361 B2 | 6/2017 | Ristock et al. |
| 9,712,576 B1 | 7/2017 | Gill |
| 9,830,398 B2 | 11/2017 | Schneider |
| 9,949,681 B2 | 4/2018 | Badenes et al. |
| 9,953,282 B2 | 4/2018 | Shaouy |
| 10,001,911 B2 | 6/2018 | Breedvelt-Schouten et al. |
| 10,264,067 B2 | 4/2019 | Subramani et al. |
| 10,308,992 B2 | 6/2019 | Chauvin et al. |
| 10,373,084 B2 | 8/2019 | Kurjanowicz et al. |
| 10,455,011 B2 | 10/2019 | Kendall |
| 10,594,788 B2 | 3/2020 | Larabie-Belanger |
| 10,616,151 B1 | 4/2020 | Cameron |
| 10,623,359 B1 | 4/2020 | Rosenstein et al. |
| 10,671,692 B2 | 6/2020 | Koopman et al. |
| 10,810,222 B2 | 10/2020 | Koch et al. |
| 10,846,105 B2 | 11/2020 | Granot et al. |
| 10,846,297 B2 | 11/2020 | Smith et al. |
| 10,922,104 B2 | 2/2021 | Sabo |
| 10,956,845 B1 | 3/2021 | Sabo |
| 10,977,434 B2 | 4/2021 | Pelz et al. |
| 10,983,685 B2 | 4/2021 | Karpe et al. |
| 11,062,270 B2 | 7/2021 | Hilleli et al. |
| 11,082,281 B2 | 8/2021 | Yamamura et al. |
| 11,095,468 B1 | 8/2021 | Pandey et al. |
| 11,113,667 B1 | 9/2021 | Jiang et al. |
| 11,138,021 B1 | 10/2021 | Rosenstein et al. |
| 11,140,174 B2 | 10/2021 | Patel et al. |
| 11,204,683 B1 | 12/2021 | Sabo |
| 11,212,242 B2 | 12/2021 | Cameron |
| 11,263,228 B2 | 3/2022 | Koch et al. |
| 11,288,081 B2 | 3/2022 | Sabo |
| 11,290,296 B2 | 3/2022 | Raghavan et al. |
| 11,327,645 B2 | 5/2022 | Karpe et al. |
| 11,341,444 B2 | 5/2022 | Sabo |
| 11,341,445 B1 | 5/2022 | Cheng et al. |
| 2002/0143594 A1 | 10/2002 | Kroeger |
| 2003/0028595 A1 | 2/2003 | Vogt et al. |
| 2003/0041317 A1 | 2/2003 | Sokolov |
| 2003/0065722 A1 | 4/2003 | Ieperen |
| 2003/0097406 A1 | 5/2003 | Stafford |
| 2003/0097410 A1 | 5/2003 | Atkins et al. |
| 2003/0126001 A1 | 7/2003 | Northcutt et al. |
| 2003/0200223 A1 | 10/2003 | Hack |
| 2003/0225598 A1 | 12/2003 | Yu et al. |
| 2004/0093290 A1 | 5/2004 | Doss et al. |
| 2004/0098291 A1 | 5/2004 | Newburn |
| 2004/0162833 A1 | 8/2004 | Jones et al. |
| 2004/0207249 A1 | 10/2004 | Baumgartner et al. |
| 2004/0230447 A1 | 11/2004 | Schwerin-Wenzel et al. |
| 2004/0268451 A1 | 12/2004 | Robbin et al. |
| 2005/0210394 A1 | 9/2005 | Crandall et al. |
| 2005/0222971 A1 | 10/2005 | Cary |
| 2006/0047454 A1 | 3/2006 | Tamaki et al. |
| 2006/0095859 A1 | 5/2006 | Bocking et al. |
| 2006/0136441 A1 | 6/2006 | Fujisaki |
| 2006/0143270 A1 | 6/2006 | Wodtke et al. |
| 2006/0190391 A1 | 8/2006 | Cullen, III et al. |
| 2006/0277487 A1 | 12/2006 | Poulsen et al. |
| 2007/0016465 A1* | 1/2007 | Schaad | G06Q 10/06 705/7.26 |
| 2007/0038494 A1 | 2/2007 | Kreitzberg et al. |
| 2007/0143169 A1 | 6/2007 | Grant et al. |
| 2007/0255715 A1 | 11/2007 | Li et al. |
| 2008/0082389 A1 | 4/2008 | Gura |
| 2008/0082956 A1 | 4/2008 | Gura et al. |
| 2008/0091782 A1 | 4/2008 | Jakobson |
| 2008/0155547 A1 | 6/2008 | Weber et al. |
| 2008/0158023 A1 | 7/2008 | Chung |
| 2008/0167937 A1 | 7/2008 | Coughlin et al. |
| 2008/0222566 A1 | 9/2008 | Daughtrey et al. |
| 2008/0244582 A1 | 10/2008 | Brown et al. |
| 2008/0270198 A1 | 10/2008 | Graves et al. |
| 2008/0281665 A1 | 11/2008 | Opaluch |
| 2009/0018835 A1 | 1/2009 | Cooper et al. |
| 2009/0055796 A1 | 2/2009 | Springborn et al. |
| 2009/0113310 A1 | 4/2009 | Appleyard et al. |
| 2009/0287523 A1 | 11/2009 | Lau et al. |
| 2009/0296908 A1 | 12/2009 | Lee et al. |
| 2009/0299803 A1 | 12/2009 | Lakritz et al. |
| 2009/0307319 A1 | 12/2009 | Dholakia et al. |
| 2010/0088137 A1 | 4/2010 | Weiss et al. |
| 2010/0106627 A1 | 4/2010 | O'Sullivan et al. |
| 2010/0122334 A1 | 5/2010 | Stanzione et al. |
| 2010/0131860 A1 | 5/2010 | DeHaan et al. |
| 2010/0145801 A1 | 6/2010 | Chekuri |
| 2010/0169802 A1 | 7/2010 | Goldstein et al. |
| 2010/0312605 A1 | 12/2010 | Mitchell et al. |
| 2010/0332236 A1 | 12/2010 | Tan |
| 2011/0015961 A1 | 1/2011 | Chan |
| 2011/0022662 A1* | 1/2011 | Barber-Mingo et al. | G06Q 10/06 706/47 |
| 2011/0054968 A1 | 3/2011 | Galaviz |
| 2011/0060720 A1 | 3/2011 | Devereux |
| 2011/0161128 A1 | 6/2011 | Barney et al. |
| 2011/0307100 A1 | 12/2011 | Schmidtke et al. |
| 2012/0035942 A1 | 2/2012 | Graupner et al. |
| 2012/0066030 A1 | 3/2012 | Limpert |
| 2012/0123835 A1 | 5/2012 | Chu |
| 2012/0158946 A1 | 6/2012 | Shafiee et al. |
| 2012/0192086 A1 | 7/2012 | Ghods et al. |
| 2012/0304187 A1 | 11/2012 | Maresh et al. |
| 2012/0317108 A1 | 12/2012 | Okazaki et al. |
| 2013/0007332 A1 | 1/2013 | Teh et al. |
| 2013/0013560 A1 | 1/2013 | Goldberg et al. |
| 2013/0014023 A1* | 1/2013 | Lee et al. | G06Q 10/101 715/751 |
| 2013/0066944 A1 | 3/2013 | Laredo et al. |
| 2013/0073328 A1 | 3/2013 | Ehrler et al. |
| 2013/0124638 A1 | 5/2013 | Barreto et al. |
| 2013/0151421 A1* | 6/2013 | Van Der Ploeg et al. | G06Q 10/06 705/301 |
| 2013/0179799 A1 | 7/2013 | Savage |
| 2013/0246399 A1 | 9/2013 | Schneider et al. |
| 2013/0275229 A1 | 10/2013 | Moganti et al. |
| 2013/0279685 A1 | 10/2013 | Kohler et al. |
| 2013/0321467 A1 | 12/2013 | Tappen et al. |
| 2013/0339099 A1 | 12/2013 | Aidroos |
| 2014/0012603 A1 | 1/2014 | Scanlon James et al. |
| 2014/0040780 A1 | 2/2014 | Artzt et al. |
| 2014/0040905 A1 | 2/2014 | Tsunoda et al. |
| 2014/0058801 A1 | 2/2014 | Deodhar et al. |
| 2014/0059910 A1 | 3/2014 | Norton et al. |
| 2014/0089719 A1 | 3/2014 | Daum |
| 2014/0172478 A1 | 6/2014 | Vadasz |
| 2014/0189017 A1 | 7/2014 | Prakash et al. |
| 2014/0200944 A1 | 7/2014 | Henriksen et al. |
| 2014/0208325 A1 | 7/2014 | Chen et al. |
| 2014/0236663 A1 | 8/2014 | Smith et al. |
| 2014/0257894 A1 | 9/2014 | Melahn et al. |
| 2014/0288987 A1* | 9/2014 | Liu | G06Q 10/063114 705/7.15 |
| 2015/0006448 A1 | 1/2015 | Gupta et al. |
| 2015/0007058 A1 | 1/2015 | Wooten |
| 2015/0113540 A1 | 4/2015 | Rabinovici et al. |
| 2015/0153906 A1 | 6/2015 | Liao et al. |
| 2015/0215256 A1 | 7/2015 | Ghafourifar et al. |
| 2015/0262111 A1 | 9/2015 | Yu et al. |
| 2015/0317595 A1* | 11/2015 | De et al. | G06F 9/4887 705/7.15 |

(56) References Cited

U.S. PATENT DOCUMENTS

| | | | |
|---|---|---|---|
| 2015/0363092 A1 | 12/2015 | Morton | |
| 2015/0379472 A1 | 12/2015 | Gilmour et al. | |
| 2016/0048408 A1 | 2/2016 | Madhu et al. | |
| 2016/0063192 A1 | 3/2016 | Johnson et al. | |
| 2016/0063449 A1 | 3/2016 | Duggan et al. | |
| 2016/0110670 A1 | 4/2016 | Chatterjee et al. | |
| 2016/0124775 A1 | 5/2016 | Ashtiani et al. | |
| 2016/0180277 A1 | 6/2016 | Skiba et al. | |
| 2016/0180298 A1 | 6/2016 | McClement et al. | |
| 2016/0182311 A1 | 6/2016 | Borna | |
| 2016/0188145 A1 | 6/2016 | Vida et al. | |
| 2016/0216854 A1 | 7/2016 | McClellan et al. | |
| 2016/0224939 A1* | 8/2016 | Chen et al. | G06Q 10/107 |
| 2016/0275436 A1 | 9/2016 | Kurjanowicz et al. | |
| 2016/0328217 A1 | 11/2016 | Hagerty | |
| 2017/0017924 A1 | 1/2017 | Kashiwagi | |
| 2017/0039503 A1 | 2/2017 | Jones et al. | |
| 2017/0061341 A1 | 3/2017 | Haas et al. | |
| 2017/0068933 A1 | 3/2017 | Norton et al. | |
| 2017/0093874 A1 | 3/2017 | Uthe | |
| 2017/0097929 A1 | 4/2017 | Cecchi et al. | |
| 2017/0103369 A1 | 4/2017 | Thompson | |
| 2017/0116552 A1 | 4/2017 | Deodhar et al. | |
| 2017/0132200 A1 | 5/2017 | Noland et al. | |
| 2017/0154024 A1 | 6/2017 | Subramanya et al. | |
| 2017/0161258 A1 | 6/2017 | Astigarraga et al. | |
| 2017/0206217 A1 | 7/2017 | Deshpande et al. | |
| 2017/0249577 A1 | 8/2017 | Nishikawa | |
| 2017/0316367 A1 | 11/2017 | Candito et al. | |
| 2017/0317898 A1 | 11/2017 | Candito et al. | |
| 2017/0323233 A1 | 11/2017 | Bencke et al. | |
| 2017/0323350 A1* | 11/2017 | Laderer et al. | G06Q 30/0276 |
| 2017/0344754 A1 | 11/2017 | Kumar et al. | |
| 2017/0346861 A1 | 11/2017 | Pearl et al. | |
| 2017/0351385 A1 | 12/2017 | Ertmann et al. | |
| 2017/0364866 A1* | 12/2017 | Steplyk et al. | G06Q 10/063114 |
| 2018/0052943 A1 | 2/2018 | Hui et al. | |
| 2018/0059910 A1 | 3/2018 | Wooten | |
| 2018/0060818 A1 | 3/2018 | Ishiyama et al. | |
| 2018/0075387 A1* | 3/2018 | Kulkarni | G06Q 10/103 |
| 2018/0089625 A1 | 3/2018 | Rosati et al. | |
| 2018/0102989 A1 | 4/2018 | Borsutsky et al. | |
| 2018/0131649 A1 | 5/2018 | Ma | |
| 2018/0165610 A1 | 6/2018 | Dumant et al. | |
| 2018/0173386 A1 | 6/2018 | Adika et al. | |
| 2018/0189706 A1* | 7/2018 | Newhouse et al. | G06Q 10/101 |
| 2018/0189736 A1* | 7/2018 | Guo et al. | G06Q 10/06311 |
| 2018/0225618 A1* | 8/2018 | Shaouy | G06Q 10/1097 |
| 2018/0225795 A1 | 8/2018 | Napoli | |
| 2018/0247352 A1 | 8/2018 | Rogers et al. | |
| 2018/0247648 A1 | 8/2018 | Nadimpalli et al. | |
| 2018/0260081 A1 | 9/2018 | Beaudoin et al. | |
| 2018/0316636 A1 | 11/2018 | Kamat et al. | |
| 2018/0331842 A1 | 11/2018 | Faulkner et al. | |
| 2018/0367477 A1 | 12/2018 | Hariram et al. | |
| 2018/0367483 A1 | 12/2018 | Rodriguez et al. | |
| 2019/0014070 A1 | 1/2019 | Mertvetsov et al. | |
| 2019/0018552 A1 | 1/2019 | Bloy et al. | |
| 2019/0138583 A1* | 5/2019 | Silk et al. | G06F 40/197 |
| 2019/0138589 A1 | 5/2019 | Udell et al. | |
| 2019/0139004 A1 | 5/2019 | Vukovic et al. | |
| 2019/0187987 A1 | 6/2019 | Fauchère et al. | |
| 2019/0265821 A1* | 8/2019 | Pearl et al. | G06F 3/048 |
| 2019/0272902 A1 | 9/2019 | Vozila et al. | |
| 2019/0318321 A1 | 10/2019 | Lopez et al. | |
| 2019/0340574 A1 | 11/2019 | Ekambaram et al. | |
| 2019/0347126 A1 | 11/2019 | Bhandari et al. | |
| 2020/0019907 A1 | 1/2020 | Notani et al. | |
| 2020/0059539 A1 | 2/2020 | Wang et al. | |
| 2020/0065736 A1 | 2/2020 | Relangi | |
| 2020/0162315 A1 | 5/2020 | Siddiqi et al. | |
| 2020/0193556 A1 | 6/2020 | Jin et al. | |
| 2020/0228474 A1 | 7/2020 | Cameron | |
| 2020/0233879 A1 | 7/2020 | Papanicolaou et al. | |
| 2020/0244611 A1 | 7/2020 | Rosenstein et al. | |
| 2020/0328906 A1 | 10/2020 | Raghavan et al. | |
| 2020/0344253 A1 | 10/2020 | Kurup et al. | |
| 2020/0349614 A1 | 11/2020 | Batcha et al. | |
| 2021/0004380 A1 | 1/2021 | Koch et al. | |
| 2021/0004381 A1 | 1/2021 | Smith et al. | |
| 2021/0089860 A1 | 3/2021 | Heere et al. | |
| 2021/0097466 A1 | 4/2021 | Sabo | |
| 2021/0103451 A1 | 4/2021 | Sabo | |
| 2021/0110347 A1 | 4/2021 | Khalil | |
| 2021/0117479 A1 | 4/2021 | Liu et al. | |
| 2021/0134296 A1 | 5/2021 | Iturbe Desentis et al. | |
| 2021/0136012 A1 | 5/2021 | Barbitta et al. | |
| 2021/0182475 A1 | 6/2021 | Pelz et al. | |
| 2021/0209561 A1 | 7/2021 | Kishore et al. | |
| 2021/0216562 A1 | 7/2021 | Smith et al. | |
| 2021/0232282 A1 | 7/2021 | Karpe et al. | |
| 2021/0287673 A1 | 9/2021 | Kaplan | |
| 2021/0320891 A1 | 10/2021 | Rosenstein et al. | |
| 2021/0342786 A1 | 11/2021 | Jiang et al. | |
| 2021/0365862 A1 | 11/2021 | Doan et al. | |
| 2021/0382734 A1 | 12/2021 | Rosenstein et al. | |
| 2022/0019320 A1 | 1/2022 | Sabo | |
| 2022/0058548 A1 | 2/2022 | Garg et al. | |
| 2022/0060345 A1 | 2/2022 | Wiener et al. | |
| 2022/0075792 A1 | 3/2022 | Koch et al. | |
| 2022/0078142 A1 | 3/2022 | Cameron | |
| 2022/0158859 A1 | 5/2022 | Raghavan et al. | |
| 2022/0377279 A1 | 11/2022 | Cronan | |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

"Rules of Data Conversion from Document to Relational Databases", published: 2014, publisher: Future-processing, pages 1-8 (Year: 2014).

(Tiburca, Andrew) Best Team Calendar Applications for 2018-Toggl https://toggl.com/blog/best-team-calendar-applications-for-2018 (Year: 2017).

Assef, F., Cassius, T. S., & Maria, T. S. (2018). Confrontation between techniques of time measurement. Journal of Manufacturing Technology Management, 29(5), 789-810. (Year: 2018).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pages 64-76. (Year: 2016).

Fruhlinger, Joshua. "The Best To-Do ListApps for Feeling Productive; With the right app, feeling productive can be just as gratifying as actually getting things done" Wall Street Journal (Online); New York, N.Y. [New York, N.Y] Nov. 8, 2013 (Year: 2013) 4 pages.

Hartmann, "TimeProjectscheduling with resource capacities and requests varying with time: a case study," 2013, Flexible services and manufacturing journal, Vol. 25, No. 1, pages 74-93 (Year: 2013).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/profesional/presentations/cotfsp06/indiv_tools/sync_chat.htm (Year: 2016) (2 pages).

Lauren Labrecque, "Fostering Consumer-Brand Relationships in Social Media Environments: The Role of Parasocial Interaction", 2014, Journal of Interactive Marketing, 28 (2014), pages 134-148 (Year: 2014).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).

(56) References Cited

OTHER PUBLICATIONS

Paul Minors, How to automate your tasks, youtube excerpts, Oct. 18, 2019 https://www.youtube.com/watch?v=lwF9XyUQrzw (Year: 2019).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved https://web.archive.Org/web/20160101054536/https://asana.com/press and https://web.archive.org/web/20160101054527/https://asana.com/product) (Year: 2016) 15 pages.
An innovative way for document and work item management in agile development process; May 10, 2013; IP.com; IPCOM000227667D.*
Macro, computer science, wikipedia, archives org Feb. 11, 2020 http://web.archive.org/web/20200211082902/https://en.wikipedia.org/wiki/Macro_(computer_science) (Year: 2020).

* cited by examiner

US 11,763,259 B1

SYSTEMS AND METHODS TO GENERATE UNITS OF WORK IN A COLLABORATION ENVIRONMENT

FIELD OF THE DISCLOSURE

The present disclosure relates to systems and methods to generate units of work in a collaboration environment.

BACKGROUND

Collaboration environments, sometimes referred to as integrated collaboration environments, may enable users to assign projects, tasks, or other assignments to assignees (e.g., other users) to complete. A collaboration environment may comprise an environment in which a virtual team of users does its work. A collaboration environment may enable users to work in a more organized and efficient manner. A collaboration environment may integrate features and/or functionality such as web-based conferencing and collaboration, desktop videoconferencing, and/or instant message into a single easy-to-use, intuitive interface.

SUMMARY

One aspect of the present disclosure relates to a system configured to generate units of work in a collaboration environment. Providing comments on digital content items (e.g., images, documents, etc..) being reviewed within the context of reviewing/approving a unit of work within a collaboration environment may be difficult by virtue of having to explain what needs to be changed and referring back to certain portions of the digital content item. In some implementations, users may leave comments directly on digital content items attached to units of work. The comments may be used to generate one or more additional units of work. Individual ones of the additional units of work may include copies or versions of the digital content items, instructions to revise in accordance with the comments, and/or other information. These additional units of work may be assigned to other users to complete, promoting clarity, organization, and/or accountability within review cycles.

One or more implementations of a system to generate units of work in a collaboration environment may include one or more hardware processors configured by machine-readable instructions. Executing the machine-readable instructions may cause the one or more hardware processors to generate units of work in a collaboration environment. The machine-readable instructions may include computer program components. The computer program components may include one or more of an environment state component, an input component, a work unit component, a user interface component, and/or other components.

The environment state component may be configured to manage environment state information maintaining a collaboration environment and/or other information. The collaboration environment may be configured to facilitate interaction by users with the collaboration environment. The environment state information may include work unit records and/or other records and/or information. The work unit records may describe units of work assigned to individual users within the collaboration environment. Individual sets of work unit records may be defined by a record hierarchy. As a result, individual work unit records in the individual sets of work unit records may be subordinate to other individual work unit records in the individual sets of work unit records. Individual units of work may include one or more digital content items. By way of non-limiting illustration, the work unit records may include a first work unit record describing a first unit of work assigned to a first user, and/or other work unit records. The first unit of work may include a first digital content item.

The input component may be configured to obtain user input information and/or other information. The user input information may convey user input on, or relating to, individual digital content items of the individual units of work.

The work unit component may be configured to generate one or more work unit records based on the user input information. By way of non-limiting illustration, responsive to the user input information conveying first user input by the first user on, or relating to, the first digital content item, work unit component may be configured generate a second work unit records describing a second unit of work. The second work unit record may be subordinate to the first work unit record.

The user interface component may be configured to effectuate presentation of a user interface displaying the units of work.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
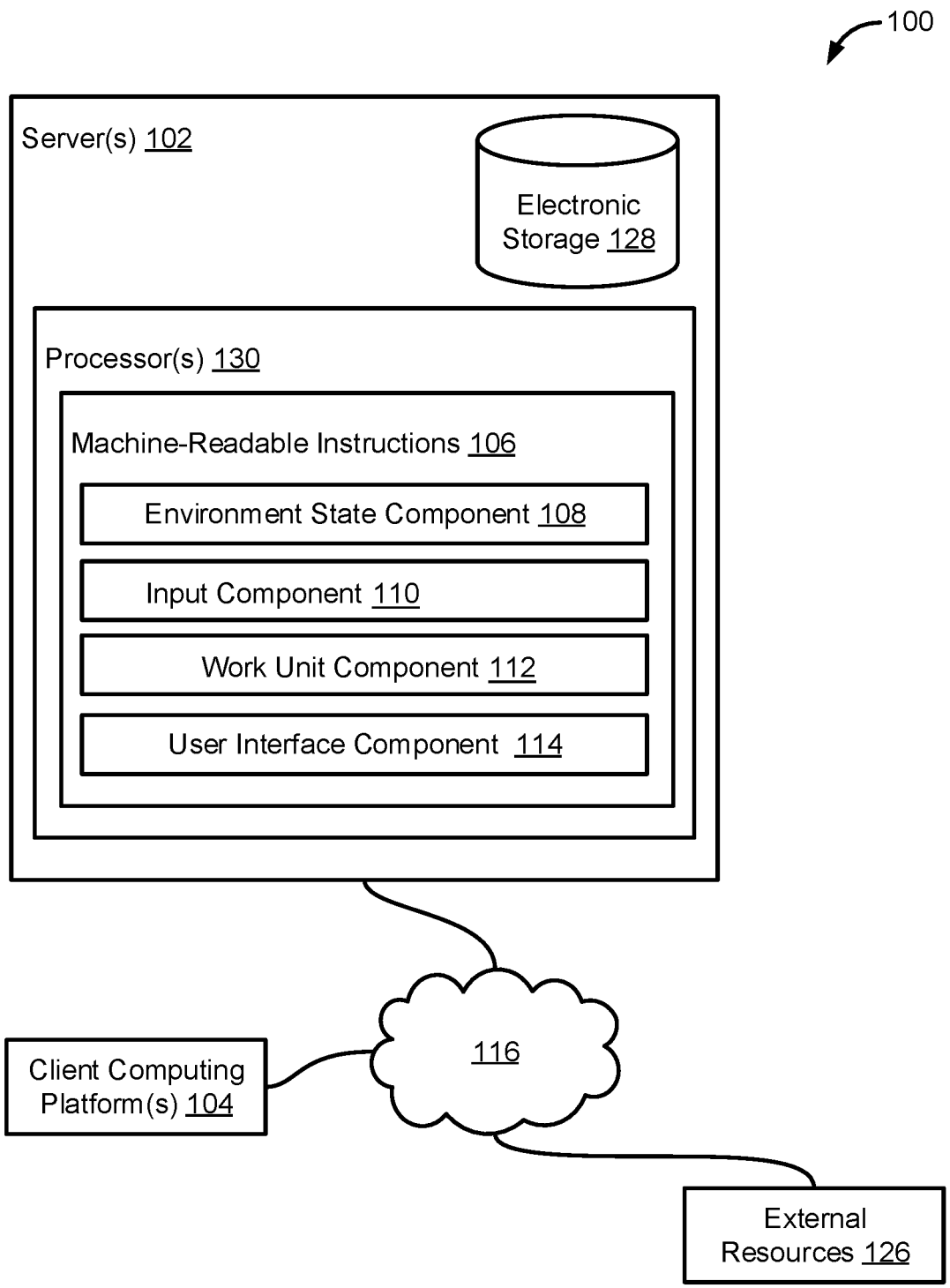
FIG. 1 illustrates a system configured to generate units of work in a collaboration environment, in accordance with one or more implementations.

FIG. 1 illustrates a system 100 configured to generate units of work in a collaboration environment, in accordance with one or more implementations. In some implementations, users may leave comments directly on digital content items attached to units of work. The comments may be used to generate one or more additional units of work. Individual ones of the additional units of work may include copies or version of the digital content items, instructions to revise in accordance with the comments, and/or other information. These additional units of work may be assigned to other users to complete, promoting clarity, organization, and/or accountability within review cycles.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate generating units of work in a collaboration environment. The computer program components may include one or more of an environment state component 108, an input component 110, a work unit component 112, a user interface component 114, and/or other instruction components.

Environment state component 108 may be configured to manage environment state information and/or other information used in maintaining a collaboration environment. The collaboration environment may be configured to facilitate interaction by users within the collaboration environment. The environment state information may include one or more of user information, work information, and/or other information used to define, support, and/or otherwise maintain a collaboration environment.

The user information may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, a user role information, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other unit of work order, etc..), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc..), one or more notification settings, one or more progress parameters, status information for one or more work units the user is associated with (units of work assigned to the user, assigned to other users by the user, completed by the user, past-due date, and/or other information), one or more performance metrics of a given user (e.g., how many units of work the user has completed, how quickly the user completed the units of work, how quickly the user completes certain types of work units, the efficiency of the user, bandwidth of the user, activity level of the user, etc..), application access information (e.g., username/password for one or more third-party applications), one or more favorites and/or priorities, schedule information, and/or other information User role information may specify individual roles of the individual users in the individual units of work. A role may represent a position of an individual user. The position may be specified based on a description of one or more of job title, level, stage, and/or other descriptions of position. The role may be specified with respect to a company as a whole, a particular unit of work, and/or other considerations. By way of non-limiting illustration, a role may include one or more of chief executive officer (or other officer), owner, manager, supervisor, accountant, associate, employee, entry level, midlevel, senior, administrator, director, foreman, engineer, product developer, human resource officer, artist, art director, and/or other description.

Schedule information for the individual users may include one or more calendar entries associated with the individual users. Individual calendar entries may be associated with the individual quantities of units of time to complete the calendar entries. The individual calendar entries may be associated with individual start dates and individual end dates.

In some implementations, schedule information may be stored locally within electronic storage 128 by virtue of features and/or functionality provided within a collaboration environment. By way of non-limiting illustration, a collaboration environment may have the features and/or functionality of calendar application configured to facilitate calendaring entries into a schedule. It is noted that schedule information may be determined through features and/or functionality provided by one or more external resources 126. By way of non-limiting illustration, an external resource may include a calendar application which may be external to a collaboration environment. The collaboration environment may have permissions to access the external calendar application to determine and/or obtain schedule information.

The work information may include values of one or more work unit parameters. The values of the work unit parameters may be organized in work unit records corresponding to units of work managed, created, and/or assigned within the collaboration environment. A given work unit may have one or more assignees and/or team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual project, an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. An individual unit of work may include an individual digital content item by virtue of the individual digital content item (and/or a copy or instance thereof) being accessible via the individual unit of work (e.g., via link, URL, a pointer, and/or other techniques to provide access). A digital content item may include one or more of an image, a video, an audio file, a PDF, a word document, and/or other digital content items.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started. In some implementations, the work unit records may include a first work unit record describing a first unit of work assigned to a first user and/or other work unit records. The first unit of work may include a first digital content item and/or other information.

Individual work units records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, as a consequence of the record hierarchies, the individual units of work described in the individual work unit records that are subordinate to the other individual work unit records may be subordinate to the individual units of work in the other individual work unit records.

In some implementations, the one or more work unit parameters may include one or more of a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, the units of work may be described based on one or more of a unit of work name, a unit of work description, one or more unit of work dates (e.g., a start date, a due date, a completion date, and/or dates), one or more members associated with a unit of work (e.g., an owner, one or more other project/task members, member access information, and/or other unit of work members and/or member information), a status parameter (e.g., an update, a hardcoded status update, a completed/incomplete/mark complete, a measured status, a progress indication, quantity of sub-work units remaining for a given unit of work, completed work units in a given project, and/or other status parameter), one or more user comment parameters (e.g., permission for who may make comments such as an assignee, an assignor, a recipient, one or more followers, and/or one or more other interested parties; content of the comments; one or more times; presence or absence of the functionality of up-votes; one or more hardcoded responses; and/or other parameters.), one or more interaction parameters (e.g., indicating a given unit of work is being worked on/was worked on, given work unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc..), state of a workspace for a given unit of work (e.g., application state parameters, application status, application interactions, user information, and/or other parameters related to the state of the workspace for a unit of work), hierarchical information, one or more custom fields (e.g., priority, cost, stage, and/or other custom fields), and/or other information.

The values of the work assignment parameter describing units of work assigned to the individual users may be determined based on one or more interactions by one or more users with a collaboration environment. In some implementations, one or more users may create and/or assign one or more unit of work to themselves and/or an other user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

The input component 110 may be configured to obtain user input information and/or other information. The user input information may convey user input on, or relating to, individual digital content items of the individual units of work. In some implementations, the user input on the individual digital content items may include comments embedded on the individual digital content items. By way of non-limiting illustration, embedding a comment may be facilitated by an application program through which the digital content item may be accessed. An application program may be external to the collaboration environment and/or integrated into the collaboration environment. An application program external to the collaboration environment may be accessible by exiting (closing, minimizing, etc..) the environment and launching the application program separately. An application program integrated into the collaboration environment may be accessible within the environment and/or that access may not require leaving or exiting the environment. In some implementations, the user input relating to the individual digital content items may include text identifying the individual digital content items. By way of non-limiting illustration, a text input field within a user interface displaying a unit of work may be dedicated to providing comments. The user input relating to the individual digital content items may include text identifying the individual digital content items being input within the text input field. The digital content item may be identified by title, hyperlink, and/or a general reference to an "attached" digital content item.

In some implementations, the user input information may further include input content of the user input and/or other information. The input content may include, for example, the text of the comment input by a user. By way of non-limiting example, first user input by the first user on, or relating to, the first digital content item may include first input content.

In some implementations, environment state information may be updated as users continue to interact with the collaboration environment over time. The environment state component 108 may store and/or archive the environment state information periodically and/or based on user request to archive. In some implementations, the environment state component 108 may store historical environment state information specifying historical user information, historical work information, and/or other information.

The work unit component 112 may be configured to generate one or more work unit records based on the user input information and/or other information. Individual ones of the generated one or more units of work may include the input content of the user input included in the user input information. The generated work unit records may be specified within a record hierarchy as being subordinate to the work unit records of units of work which have received the user input. In some implementations, a generated unit of work may include the input content of the user input by virtue of the input content being specified in one or more work unit parameters of the generated unit of work. By way of non-limiting illustration, the input content may be transcribed as the unit of work description of the generated unit of work.

By way of non-limiting example, responsive to the user input information conveying the first user input by the first user on, or relating to, the first digital content item, work unit component 112 may generate a second work unit record describing a second unit of work and/or other units of work. The second work unit record may be subordinate to the first work unit record. Based on the first user input by the first user on, or relating to, the first digital content item including first input content, the second unit of work may include the first input content. In some implementations, the first input content may be transcribed into a unit of work description of the second unit of work.

In some implementations, work unit component 112 may be configured to generate the one or more work unit records based on the user input information by including one or more instances of the individual digital content items in the one or more units of work. By way of non-limiting example, the second unit of work may include an instance of the first digital content item.

In some implementations, work unit component 112 may be configured to automatically assign individual ones of the individual units of work included in the one or more work unit records generated based on the user input information to individual users who are assignors of the individual units of work which have received the user input. By way of non-limiting example, based on a second user being an assignor of the first unit of work to the first user, the second unit of work may be assigned to the second user. In some implementations, the work unit component 112 may be configured to automatically assign individual ones of the individual units of work included in the one or more work unit records generated based on the user input information to individual users of a particular roll. In some implementations, assignment may be dictated (e.g., changed from the automatic assignment, initially specified, etc..) by the assignee to other users as needed. By way of non-limiting illustration, the first user may assign the second unit of work to one or more other users as desired.

In some implementations, user interface component 114 may be configured to effectuate presentation of individual user interfaces on individual client computing platforms of one or more client computing platforms 104. The user interface component 114 may be configured to effectuate presentation of a user interface displaying the units of work. In some implementations, the user interface may display representations of the units of work in a timeline based on individual start dates and individual end dates of the individual units of work. In some implementations, the user interface may display representations of the units of work in an ordered list based on individual start dates of the individual units of work. In some implementations, representations of the units of work may include icons, graphics, and/or other elements. Selection of a representation of the units of work may facilitate generating views displaying the units of work.

The user interface may include one or more user interface elements configured to facilitate user interaction with the user interface. By way of non-limiting illustration, user interface elements may include one or more of text input fields, drop down menus, check boxes, display windows, virtual buttons, and/or other elements configured to facilitate user interaction.

A user interface may be configured to obtain user input comprising user entry and/or selection of one or more of the individual digital content items of the individual units of work, input content, and/or other information. One or more user interface elements facilitating entry and/or selection may comprise one or more text input fields, one or more check boxes, one or more drop down menus, and/or other user interface elements.

Figure 3:
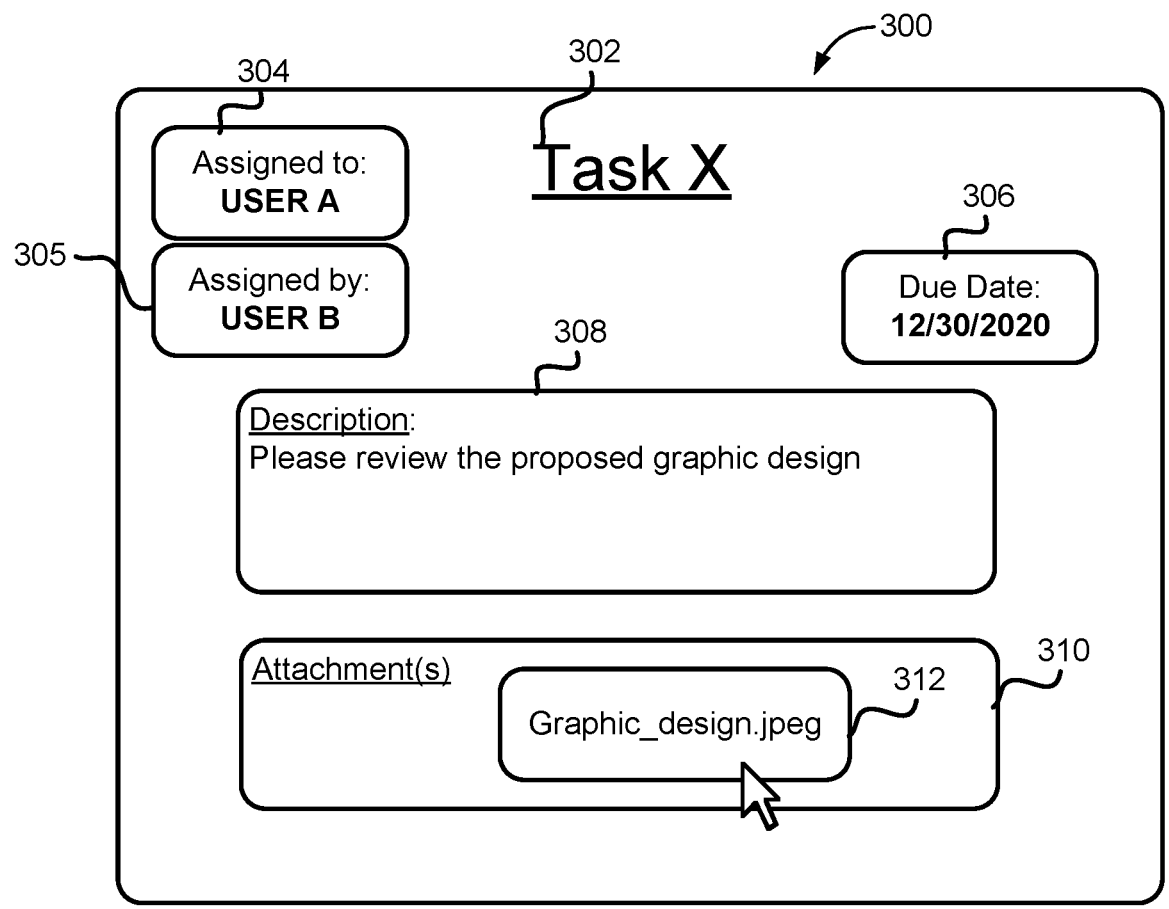
FIG. 3 illustrates a user interface, in accordance with one or more implementations.

FIG. 3 illustrates a user interface 300, in accordance with one or more implementations. The user interface 300 may display a first unit of work. The user interface 300 may display different values of one or more work unit parameters of the first unit of work, and/or other information. By way of non-limiting illustration, a user interface element 302 may display a title of the first unit of work (e.g., Task X). A user interface element 304 may display an assignee of the first unit of work (e.g., User A). A user interface element 305 may display an assignor of the first unit of work (e.g., User B). A user interface element 306 may display a due date of the first unit of work. A user interface element 308 may display a unit of work description for the first unit of work. A user interface element 310 may include digital content items included in the first unit of work. By way of non-limiting illustration, a digital content item 312 may be included. Digital content item 312 may be represented in the user interface element 310 by an icon and/or graphic through which the digital content item 312 may be accessed. For illustrative purposes, the description of the unit of work may include reviewing a proposed graphic design. The digital content item 312 may include JPEG file of the proposed design graphic. A user, e.g., User A, may select the digital content item 310 to review it.

Figure 4:
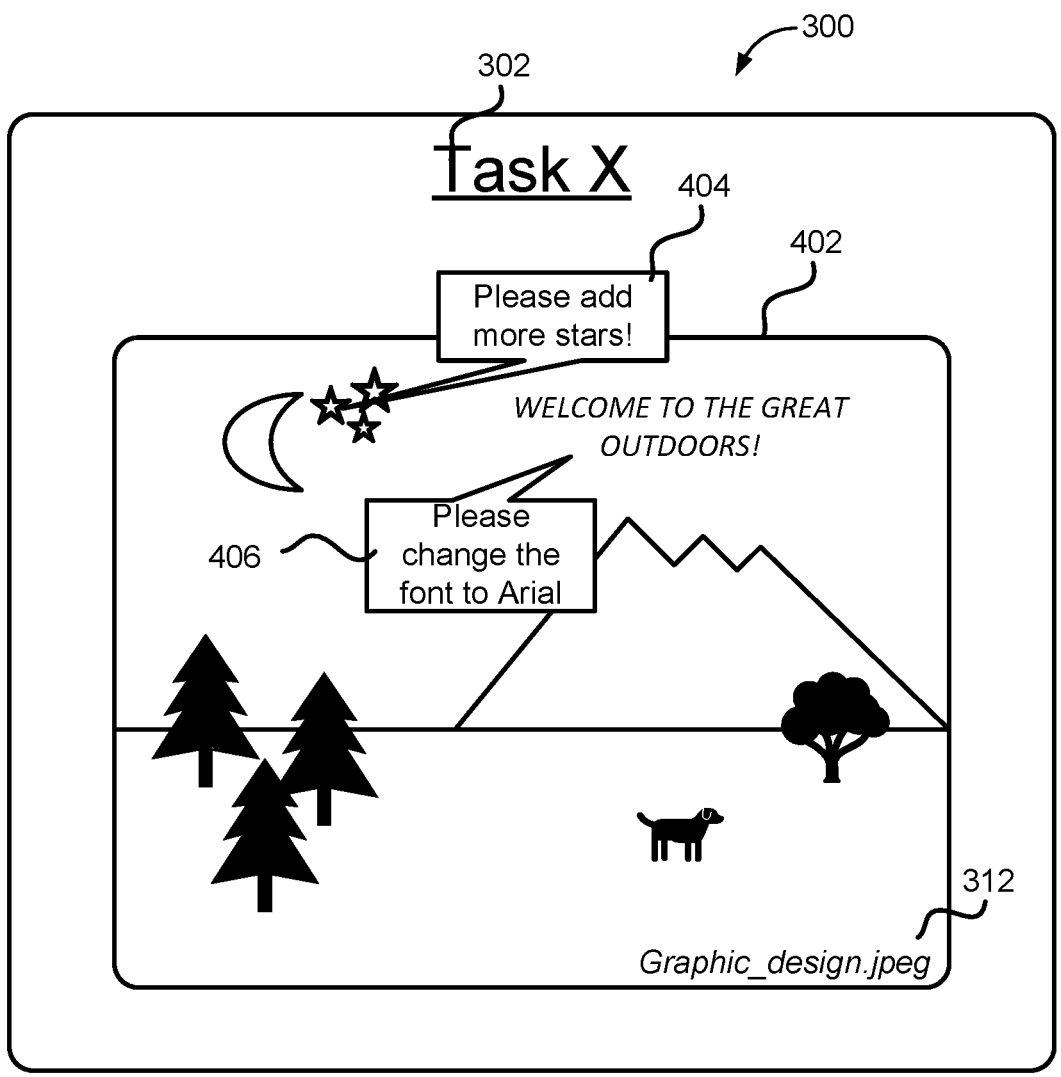
FIG. 4 illustrates a user interface, in accordance with one or more implementations.

FIG. 4 illustrates user interface 300, in accordance with one or more implementations. The user interface 300 may include a view showing the digital content item 312 in a pop up window 402. The user interface 300 further shows user input on the digital content item 312. The user input may include input comprising one or more of first input content 404, second input content 406, and/or other content. The input content may be provided as comments embedded in the digital content item via, for example, comment boxes. For illustrative purpose, the first input content 404 may comprise text of "please add more stars" in relation to the part of the graphic depicting stars. The second input content 406 may comprise text of "please change the font to Arial" in relation to the part of the graphic depicting text.

Figure 5:
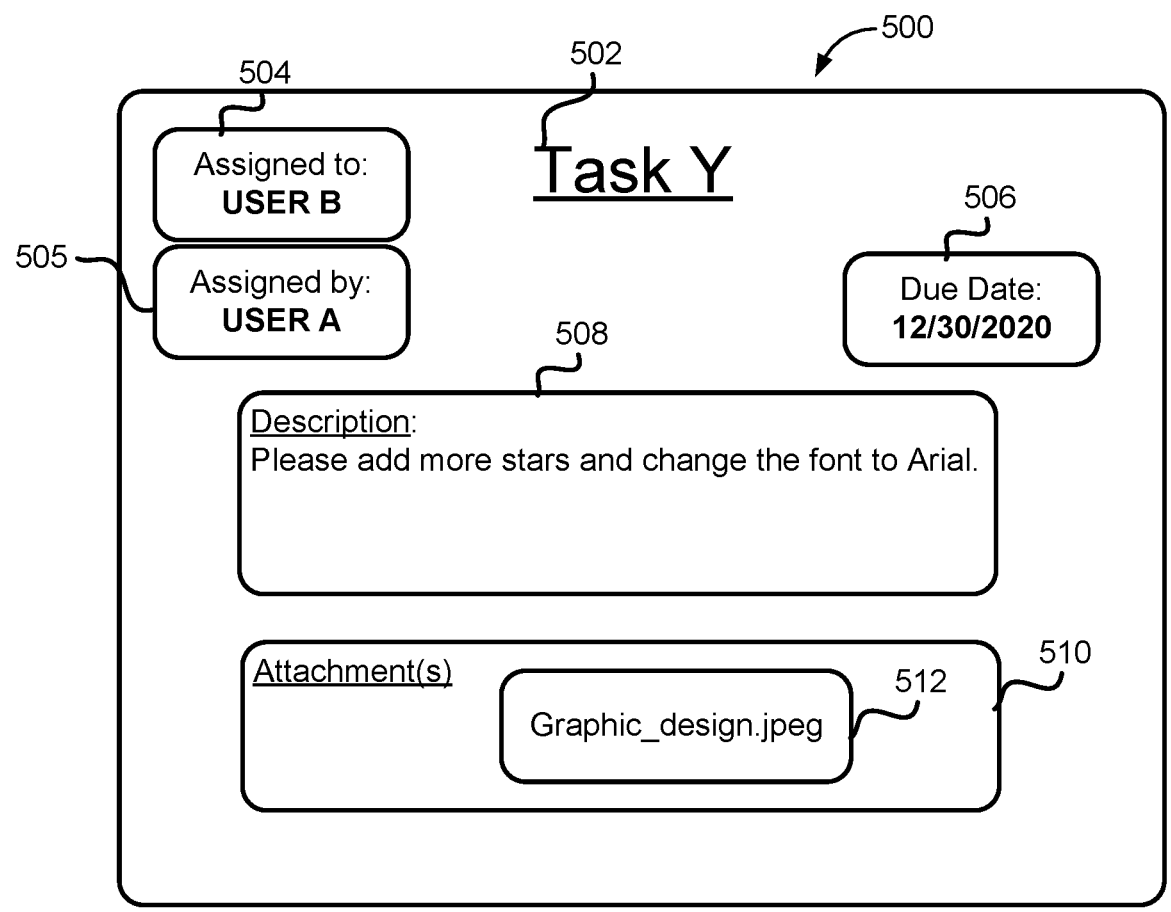
FIG. 5 illustrates a user interface, in accordance with one or more implementations.

FIG. 5 illustrates a user interface 500, in accordance with one or more implementations. The user interface 500 may display a second unit of work generated based on the user input into the digital content item 312 of FIGS. 3 and/or 4. The second unit of work may be generated via a work unit record which may be specified as being subordinate to a work unit record of the first unit of work in FIG. 3. The user interface 500 may display values of one or more work unit parameters of the second unit of work, and/or other information. The one or more values may reflect the input content of FIG. 4. The assignee may be automatically set to be the assignor of the first unit of work of FIG. 3. By way of non-limiting illustration, a user interface element 502 may display a title of the second unit of work (e.g., Task Y). A user interface element 504 may display an assignee of the second unit of work (e.g., User B). A user interface element 505 may display an assignor of the second unit of work (e.g., User A). A user interface element 506 may display a due date of the second unit of work. A user interface element 508 may display a unit of work description for the second unit of work. The description may include the input content, e.g., "Please add more stars and change the font to Arial." A user interface element 510 may include digital content items included in the second unit of work. By way of non-limiting illustration, a digital content item 512 may be included. Digital content item 512 may be represented in the user interface element 510 by an icon and/or graphic through which the digital content item 512 may be accessed. Digital content item 512 may be a copy of digital content item 312 of FIG. 3. Digital content item 512 may be a copy of digital content item 312 with the embedded user input.

It is noted that FIGS. 3-5 are for illustrative purposes only and are not to be considered limiting. Instead, it is to be understood that user interfaces may be configured in other ways and/or including other elements in accordance with one or more implementations of the system 100 presented herein.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc..) or a drive (e.g., a disk drive, etc..). Electronic storage 128 may include one or more of optically readable storage media (e.g., optical disks, etc..), magnetically readable storage media (e.g., magnetic tape, magnetic hard drive, floppy drive, etc..), electrical charge-based storage media (e.g., EEPROM, RAM, etc..), solid-state storage media (e.g., flash drive, etc..), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
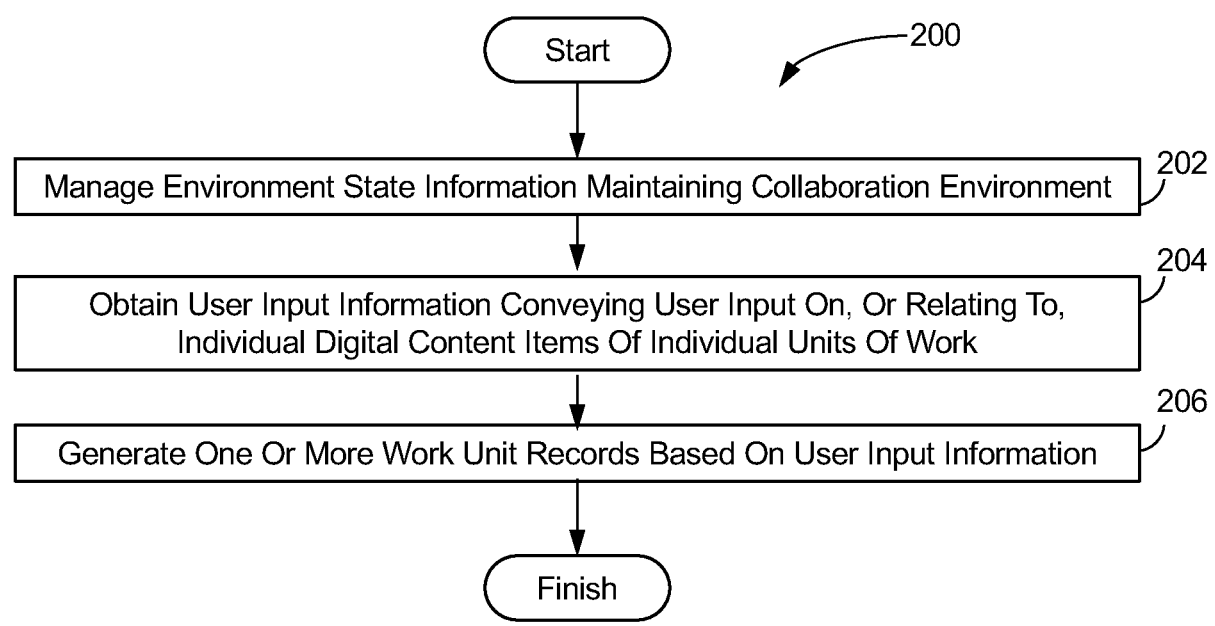
FIG. 2 illustrates a method to generate units of work in a collaboration environment, in accordance with one or more implementations.

FIG. 2 illustrates a method 200 to generate units of work in a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include work unit records describing units of work assigned to individual users within the collaboration environment. Individual sets of work unit records may be defined by a record hierarchy such that individual work unit records in the individual sets of work unit records may be subordinate to other individual work unit records in the individual sets of work unit records. Individual units of work may include one or more digital content items. By way of non-limiting illustration, the work unit records may include a first work unit record describing a first unit of work assigned to a first user. The first unit of work may include a first digital content item. Operation 202 may be performed by one or more hardware processors configured by machine-readable instructions including a component that is the same as or similar to environment state component 108, in accordance with one or more implementations.

An operation 204 may obtain user input information conveying user input on, or relating to, individual digital content items of the individual units of work. Operation 204 may be performed by one or more hardware processors configured by machine-readable instructions including a component that is the same as or similar to input component 110, in accordance with one or more implementations.

An operation 206 may generate one or more work unit records based on the user input information. Operation 206 may be performed by one or more hardware processors configured by machine-readable instructions including a component that is the same as or similar to work unit component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate work unit records in a collaboration environment, the system comprising:
   non-transitory electronic storage storing environment state information maintaining a collaboration environment, the environment state information including work unit records describing units of work assigned to users within the collaboration environment, wherein individual sets of the work unit records are defined by an individual record hierarchy such that individual ones of the work unit records in the individual sets of the work unit records are subordinate to other individual ones of the work unit records in the individual sets of the work unit records, the individual ones of the work unit records including one or more digital content items that individual ones of the users assigned to individual ones of the units of work are expected to review in order to complete the individual ones of the units of work, such that the work unit records include a first work unit record describing a first unit of work assigned to a first user, the first work unit record including a first digital content item that the first user is expected to review in order to complete the first unit of work; and one or more physical processors configured by machine-readable instructions to:

manage, at a server, the environment state information maintaining the collaboration environment to facilitate interaction by the users with the collaboration environment, wherein the users interact with the collaboration environment via remotely located client computing platforms communicating with the server over an Internet connection;

establish the Internet connection between the remotely located client computing platforms and the server;

effectuate communication of information from the server to the remotely located client computing platforms over the Internet connection so that the remotely located client computing platforms present instances of a user interface of the collaboration environment, wherein the work unit records and the one or more digital content items of the work unit records are accessed through the user interface;

obtain, at the server, user input information conveying user input on, or relating to, individual ones of the one or more digital content items through the user interface at the remotely located client computing platforms;

generate, at the server and responsive to obtaining the user input information, one or more new ones of the work unit records based on the user input information, such that responsive to the user input information conveying first user input by the first user on, or relating to, the first digital content item, generate a second work unit record for a second unit of work, the second work unit record being subordinate to the first work unit record within a first record hierarchy including the first work unit record and the second work unit record; and effectuate storage of information defining the one or more new ones of the work unit records in the non-transitory electronic storage.

2. The system of claim 1, wherein the one or more new ones of the work unit records are generated based on the user input information by including one or more instances of the individual ones of the one or more digital content items, such that the second work unit record for the second unit of work includes an instance of the first digital content item.

3. The system of claim 1, wherein the user input on the individual ones of the one or more digital content items includes comments embedded in the individual ones of the one or more digital content items.

4. The system of claim 1, wherein the user input relating to the individual ones of the one or more digital content items includes text identifying the individual ones of the one or more digital content items.

5. The system of claim 1, wherein the user input information further includes input content of the user input, and wherein the one or more new ones of the work unit records are generated to include the input content, such that based on the first user input by the first user on, or relating to, the first digital content item including first input content, the second work unit record for the second unit of work includes the first input content.

6. The system of claim 1, wherein the one or more physical processors are further configured by the machine-readable instructions to:

assign the units of work associated with the one or more new ones of the work unit records to the individual ones of the users who are assignors of the individual ones of the work unit records that include the one or more digital content items, such that based on a second user being an assignor of the first work unit record to the first user, the second work unit record is assigned to the second user.

7. The system of claim 1, wherein digital content items of the one or more digital content items include one or more of an image, a video, an audio file, a PDF, or a word document.

8. The system of claim 1, wherein the user interface further displays the units of work in a timeline based on individual start dates and individual end dates of the individual ones of the units of work.

9. The system of claim 1, wherein the user interface further displays the units of work in an ordered list based on individual start dates of the individual ones of the units of work.

10. A method to generate work unit records in a collaboration environment, the method comprising:

storing, in non-transitory electronic storage, environment state information maintaining a collaboration environment, the environment state information including work unit records describing units of work assigned to users within the collaboration environment, wherein individual sets of the work unit records are defined by an individual record hierarchy such that individual ones of the work unit records in the individual sets of the work unit records are subordinate to other individual ones of the work unit records in the individual sets of the work unit records, the individual ones of the work unit records including one or more digital content items that individual ones of the users assigned to individual ones of the units of work are expected to review in order to complete the individual ones of the units of work, such that the work unit records include a first work unit record describing a first unit of work assigned to a first user, the first work unit record including a first digital content item that the first user is expected to review in order to complete the first unit of work managing, at a server, the environment state information maintaining the collaboration environment to facilitate interaction by the users with the collaboration environment, wherein the users interact with the collaboration environment via remotely located client computing platforms communicating with the server over an Internet connection;

establishing the Internet connection between the remotely located client computing platforms and the server;

effectuating communication of information from the server to the remotely located client computing platforms over the Internet connection so that the remotely located client computing platforms present instances of a user interface of the collaboration environment, wherein the work unit records and the one or more digital content items of the work unit records are accessed through the user interface;

obtaining, at the server, user input information conveying user input on, or relating to, individual ones of the one or more digital content items through the user interface at the remotely located client computing platforms;

generating, at the server and responsive to the obtaining the user input information, one or more new ones of the work unit records based on the user input information, including responsive to the user input information conveying first user input by the first user on, or relating to, the first digital content item, generating a second work unit record for a second unit of work, the second work unit record being subordinate to the first work unit record within a first record hierarchy including the first work unit record and the second work unit record; and effectuating storage of information defining the one or more new ones of the work unit records in the non-transitory electronic storage.

11. The method of claim 10, wherein the one or more new ones of the work unit records are generated based on the user input information by including one or more instances of the individual ones of the one or more digital content items, such that the second work unit record for the second unit of work includes an instance of the first digital content item.

12. The method of claim 10, wherein the user input on the individual ones of the one or more digital content items includes comments embedded in the individual ones of the one or more digital content items.

13. The method of claim 10, wherein the user input relating to the individual ones of the one or more digital content items includes text identifying the individual ones of the one or more digital content items.

14. The method of claim 10, wherein the user input information further includes input content of the user input, and wherein the one or more new ones of the work unit records are generated to include the input content, such that based on the first user input by the first user on, or relating to, the first digital content item including first input content, the second work unit record for the second unit of work includes the first input content.

15. The method of claim 10, further comprising:

assigning the units of work associated with the one or more new ones of the work unit records to the individual ones of the users who are assignors of the individual ones of the work unit records that include the one or more digital content items, including based on a second user being an assignor of the first work unit record to the first user, assigning the second work unit record to the second user.

16. The method of claim 10, wherein digital content items of the one or more digital content items include one or more of an image, a video, an audio file, a PDF, or a word document.

17. The method of claim 10, wherein the user interface further displays the units of work in a timeline based on individual start dates and individual end dates of the individual ones of the units of work.

18. The method of claim 10, wherein the user interface further displays the units of work in an ordered list based on individual start dates of the individual ones of the units of work.

\* \* \* \* \*